A. Newton,
Screw Driver.
No. 108,383. Patented Oct. 18, 1870.
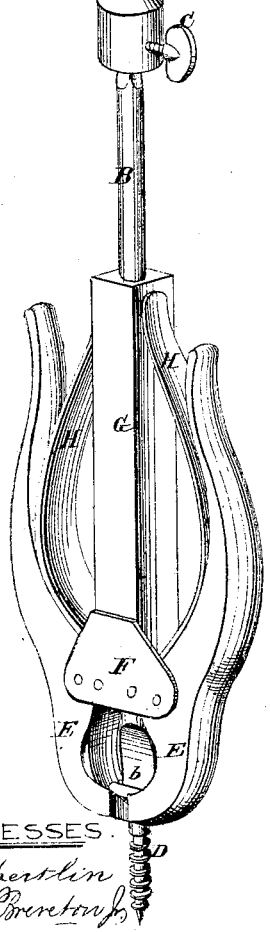
FIG.1.
FIG.3.
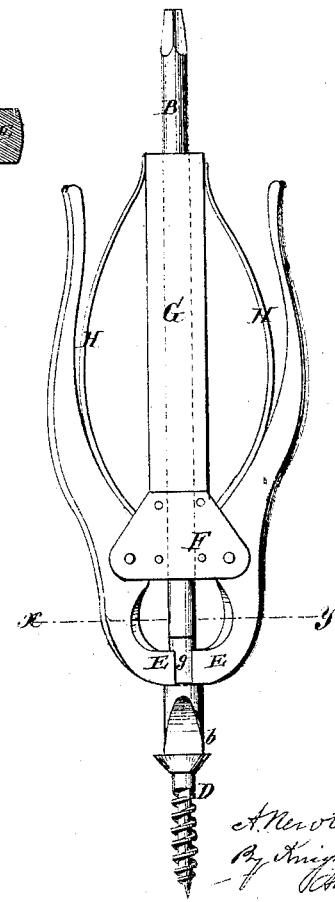
FIG.2.
WITNESSES
T. Schertlin
Wm. H. Brereton Jr.
A. Newton
By Knight Bros.
Attorneys

United States Patent Office.

ABNER NEWTON, OF DARBY CREEK, OHIO.

Letters Patent No. 108,383, dated October 18, 1870.

IMPROVEMENT IN SCREW-DRIVERS.

The Schedule referred to in these Letters Patent and making part of the same.

I, ABNER NEWTON, of Darby Creek, in the county of Madison and State of Ohio, have invented an Improved Screw-Driver, of which the following is a specification.

Nature and Objects of the Invention.

The shank of the driver has a pair of spring jaws which embrace the barrel of the screw between the head and the thread.

The shank and the attached jaws may rotate together while entering the screw, or the driver may rotate without the clamp, still rotating the screw.

When the screw has entered, the jaws are retracted and slipped back, so that the screw may be driven clear home, the jaws at this time resting against a swivel-sleeve on the driver, so that the clamp may be grasped in the hand, while the shank of the driver rotates freely within it.

Description of the Accompanying Drawing.

Figure 1 is a view of the screw-driver, represented as affixed to a brace, of which the lower part only is shown.

Figure 2 is a view in which the spring clamp is shown retracted.

Figure 3, a cross-section, on the line $x\,y$, fig. 2.

General Description.

A represents the lower end of an ordinary brace, into which the shank B of the screw-driver bit is slipped, and secured by the set-screw C.

The bit $b$ of the driver enters the slit of the wood screw D, and the jaws E E (in fig. 1,) incloses the barrel of the screw, the barrel being the portion between the thread and the head.

The jaws E E are hinged to the plates F F, the latter being secured to the sleeve G, within which the shank B of the screw-driver may revolve.

The springs H H press outward the tails of the jaws and close the latter upon the barrel of the screw.

Operation.

The tool being in the condition shown in fig. 1, the screw is placed so that its barrel is grasped by the jaws, the bit of the driver entering the slit of the screw. The latter may now be presented to and driven into the place desired.

The jaws and sleeve may rotate with the screw-driver proper, unless the space is too confined, in which case the driver alone may rotate inside of the sleeve, and the screw inside of the jaws.

When the screw has been entered for a certain distance, say about half its length, or until the jaws come in contact with the surface into which the screw is being driven, they are withdrawn and slipped back into the position shown in fig. 2. The bit is not withdrawn from the screw for this purpose, nor need the revolution of the brace be stopped; one hand of the operator retracts the jaws and slips them back, so that they rest upon a swivel-sleeve, $g$, above the head of the bit $b$.

Claim.

What I claim as new is—

The hinged jaws F, in combination with springs H H, and with the main attaching sleeve G, and swivel-sleeve $g$, arranged substantially as represented, so as to permit the driver B $b$ to turn freely within the said sleeves G and $g$, and jaws E E, in the manner described.

ABNER NEWTON.

Witnesses:
M. A. WINGET,
J. F. CHAPMAN.